United States Patent Office 3,711,510
Patented Jan. 16, 1973

3,711,510
2-METHYL-1,3-PROPANEDIAMINE
DERIVATIVES
Mario G. Buzzolini, Apt. 91J, Parson's Village,
3 W. South Street, Morristown, N.J. 07924
No Drawing. Filed June 2, 1970, Ser. No. 42,897
Int. Cl. C07d 27/04; C07c 93/06
U.S. Cl. 260—326.5 G
9 Claims

ABSTRACT OF THE DISCLOSURE

The invention discloses compounds of the class of 2-substituted 2-methyl-1,3-propanediamines which are either 2 - [p - (3,5-diphenylcyclohexyl)phenoxy] - 2 - methyl-1,3-propanediamines or 2-(5'-phenyl-m-terphenyl-4-yloxy)-2-methyl-1,3-propanediamines. The compounds are useful as pharmaceutical agents, e.g., as hypolipidemic agents. The compounds may be prepared by dehydration and dehydrogenation or hydrogenation of corresponding compounds which are 3,5-diphenyl-cyclohexan-1-ols or 3,5-diphenyl-2-cyclohexen-1-ols.

This invention relates to cyclo-substituted-2-methyl-1,3-propanediamines and to methods of preparing the same. The invention also relates to pharmaceutical compositions and methods utilizing the pharmacological activity of said compounds.

The 2-methyl-1,3-propanediamines of the invention are from the group of:

(A) Compounds represented by the structural Formula I:

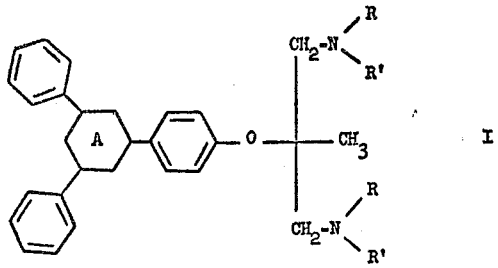

wherein Ring A is a fully saturated or the aromatic hydrocarbon ring, i.e., a cyclohexyl or phenyl moiety, and each of R and R' is independently lower alkyl of 1 to 3 carbon atoms, or together with the nitrogen to which they are attached form a saturated heterocyclic ring having 5 to 7 ring atoms of which one is nitrogen and the balance are carbon atoms, e.g. N-pyrrolidyl; and (B) an N-oxide of the compounds of the Formula I; or a pharmaceutically acceptable acid addition salt of (A) and (B), above.

A preferred method of preparing the compounds of Formula I in which the Ring A is a saturated ring involves subjecting in a Step A a corresponding 3,5-diphenyl - cyclohexan - 1 - ol or 2-cyclohexen-ol of the Formula II:

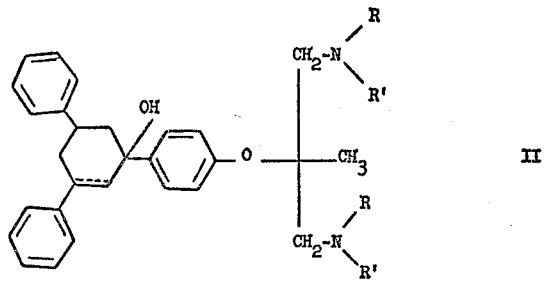

wherein R and R' are as defined above and the dotted line represents an optional double bond, to catalytic hydrogenation, whereby there is obtained a compound of the invention of the Formula I-A:

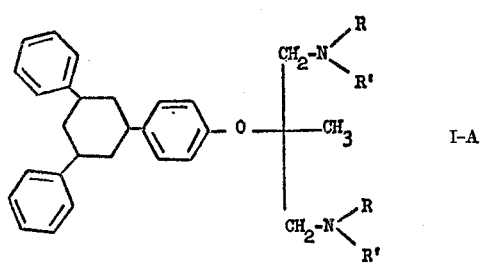

wherein R and R' are as above defined.

A preferred method of preparing the compounds of Formula I in which the Ring A is an unsaturated ring involves subjecting in a Step B a 3,5-diphenyl-cyclohexen-1-ol or 2-cyclohexen-1-ol of the Formula II to dehydration and dehydrogenation whereby there is obtained a compound of the invention of the Formula I-B:

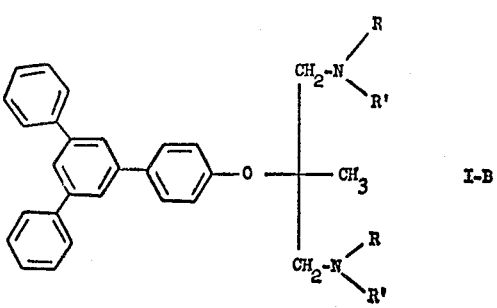

wherein R and R' are as defined above.

The reaction of Step A to produce compounds I–A from a compound II involves a catalytic hydrogenation which may be carried out over a fairly wide temperature range typically from 10° C. to 100° C., preferably between 20° C. to 80° C. The hydrogenation may be carried out at atmospheric pressure or at supertamospheric pressure, and usually in the range between atmospheric pressure up to 2000 p.s.i. The hydrogenation is conducted preferably with an approximately required stoichiometric amount of elemental hydrogen and in the presence of an inert organic solvent and a hydrogenation catalyst of which several are known and available, such as platinum supported on carbon or palladium on carbon. The especially preferred catalyst is palladium supported on carbon, e.g., a catalyst of a minor portion of 3–10% palladium on 90–97% charcoal. Such charcoal supported palladium catalysts are of a well-known type. The especially preferred solvent for use with palladium-carbon catalyst is acetic acid. The preferred compounds II for the preparation of compounds I–A are the compounds which are of the class of 3,5-diphenylcyclohexan-1-ols. Compounds I–A are conveniently isolated in the form of an acid addition salt, preferably the hydrochloride, and, if desired, may be converted to the free base by conventional procedures.

The production of compounds I–B of the invention from a compound II by Step B involves subjecting said compound II to dehydration and dehydrogenation. The dehydration and dehydrogenation may be carried out as separate steps employing known reagents and conditions suitable for the purpose. It is, however, convenient and desirable to react the compound II with thionyl chloride whereby dehydrogenation and dehydration are achieved in a single step. The reaction with thionyl chloride is highly exothermic requiring controlled combination of the reactants and low reaction temperatures, preferably between minus 70° C. to minus 20° C. The reaction is conveniently carried out in an inert solvent medium, preferably a chlorinated solvent medium. Examples of preferred solvents include methylene chloride, chloroform and carbon tetrachloride, especially methylene chloride. The preferred compounds II for the preparation of the compounds I-B are the compounds of the class of 3,5-diphenyl-2-cyclohexen-1-ols. The reaction product of Formula I-B is conveniently isolated in the form of an acid addition salt, preferably the hydrochloride and, if desired, may be converted to the free base by conventional procedures.

The terms "N-oxide," "N-oxides" and the like as used herein refer to both the mono-N-oxides and di-N-oxides of the compounds I as represented respectively by the following Formulae I–C and I–D:

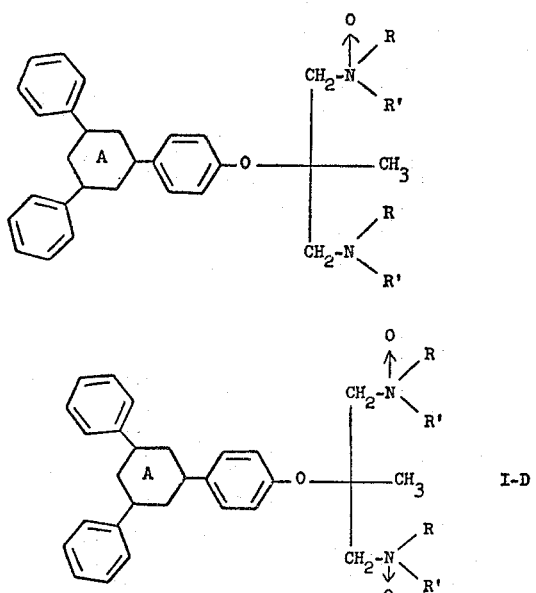

I-C

I-D

In general, the N-oxides of the Formulae I–C and I–D may be produced in a known manner by subjecting a compound of the Formula I–A or I–B to reaction with a suitable oxidizing agent, for example, with a peracid such as perbenzoic acid, m-chloroperbenzoic acid or peracetic acid with or without a solvent, e.g. chloroform, as may be desired or required depending upon the selection of a liquid or solid oxidizing agent, at temperatures between room temperature and about 90° C. The production of the N-oxides is preferably carried out with a peroxide by established procedures, for example, by reaction of a compound I–A or I–B with hydrogen peroxides in a suitable inert solvent at temperatures between room temperature and about 90° C. Examples of preferred organic solvents typically employed with hydrogen peroxide include ethanol, acetic acid and acetic anhydride. Depending upon known factors such as time, temperature and the amount of the oxidizing agent employed the reaction product is the di-N-oxide or is a mixture containing predominantly the mono-N-oxide or the di-N-oxide and such products may be isolated and the mono-N-oxide and di-N-oxide separated from each other as required by employing conventional procedures.

The compounds of Formula II, above, in which the dotted line does not represent a double bond are referred to herein as the compounds of the Formula II–A and are preferably produced in a Step 1 reaction involving subjecting a compound of the Formula III:

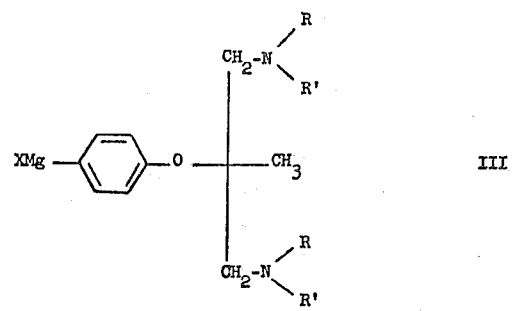

III wherein X is chloro, bromo or iodo, preferably bromo, to reaction with a compound of the Formula IV:

IV whereby there is obtained a compound of the Formula II–A:

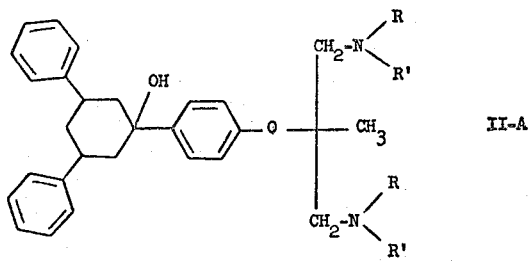

II-A wherein R and R' are as above defined.

The compounds of the Formula II, above, in which the dotted line represents a double bond are referred to herein as the compounds of the Formula II–B and are preferably produced in a Step 2 reaction involving subjecting a compound of the Formula III to reaction with a compound of the Formula V:

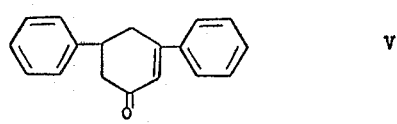

V whereby there is obtained a compound of the Formula II–B:

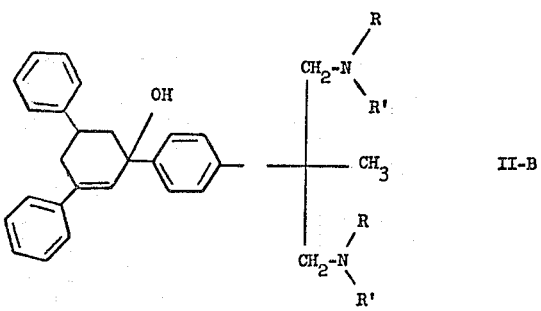

II-B

The preparation of the compounds II–A by the reaction Step 1 involving reaction of a compound III with a compound IV is carried out in a conventional manner in the presence of an inert organic solvent and preferably at temperatures between about −10° C. to +80° C., followed by hydrolysis in the conventional manner, i.e., by treating with water or with a saturated ammonium chloride solution. Preferred solvents are those customarily employed in Grignard reactions, including, by way of illustration, tetrahydrofuran, dioxane and other ethers such as diethyl ether, more preferably tetrahydrofuran. The reaction product of the Formula II–A may be isolated from the reaction mixture of Step 1 by working up by conventional procedures.

The preparation of the compounds II–B by the reaction Step 2 is carried out similarly to the reaction of Step 1.

The compounds of the Formulae IV and V are known compounds. The compounds of the Formula III are novel compounds and may be prepared in a Step 3 reaction by subjecting a compound of the Formula III–A:

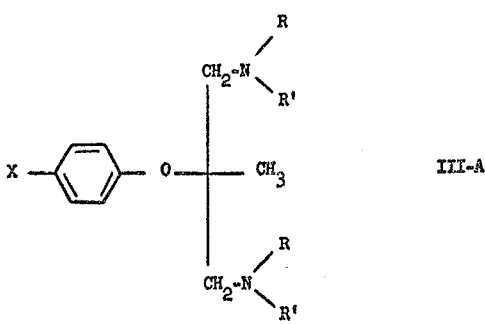

III-A wherein R, R' and X are as above defined, to reaction with magnesium in a conventional manner.

The compounds of the Formula III–A are novel and preferably prepared by reacting in a Step 4 a compound of the Formula VI:

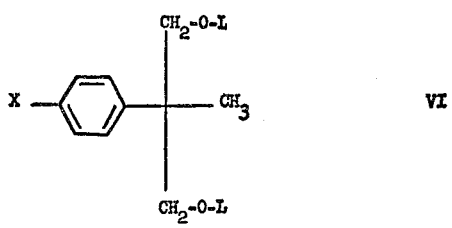

VI wherein X is as defined and L is a liable leaving group of known type, to reaction with a compound of the Formula VII:

VII wherein R and R' are as above defined.

The reaction of Step 4 may be carried out in a conventional manner at elevated temperatures in the range of from 80° C. to 200° C., preferably 120° C. to 180° C. The reaction is desirably carried out in an inert liquid medium which may be provided by employing an excess of the compounds VII with or without an added co-solvent as may be desired or required. Co-solvents which may be employed may be any of several inert conventional solvents such as the well known amides such as dimethylacetamide. The preferred labile group L is a p-toluenesulfonate group. The compounds of Formula III–A may be isolated from the reaction mixture of Step 4 by working up by conventional procedures.

The compounds of Formula VI are novel and may be prepared in a Step 5 by subjecting a compound of the Formula VIII:

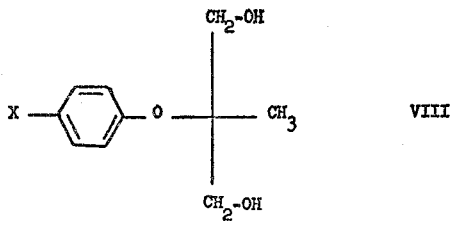

VIII wherein X is as defined, to reaction with a compound of the Formula IX:

$$X'—L'$$  IX wherein X' is chloro or bromo, preferably chloro, and L' is a group forming the labile group L as above defined.

The reaction of Step 5 may be carried out in a conventional manner at temperature in the range of from minus 20° C. to plus 40° C. in an inert organic solvent and in the presence of an acid binding agent. The organic solvents employed may be any of several of the conventional solvents inert under the reaction conditions, preferably a chlorine-containing solvent such as chloroform. Suitable acid binding agents include the tertiary amines such as triethylamine. A preferred compound of the Formula IX is p-toluenesulfonylchloride. The reaction product of Formula VI may be isolated from the Step 5 reaction mixture by working up by established procedures.

The compounds of Formula VIII are novel and preferably prepared in a Step 6 reaction by subjecting a compound of the Formula X:

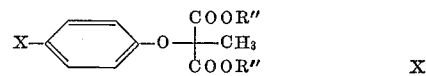

X wherein X is as defined and R'' is hydrogen or lower alkyl of 1 to 4 carbon atoms, to reduction in a known manner.

The preparation of compounds VIII by reduction of a compound X may be suitably carried out at temperatures in the range of from 0° C. to 100° C., preferably 40° C. to 80° C. and in an inert organic solvent. The reducing agent may be any of several known types suitable for reducing an organic acid or ester to the corresponding alcohol. The generally preferred reducing agents are the metal hydrides such as lithium aluminum hydride sodium borohydride. The solvent employed may be any of several conventional organic solvents providing an inert solvent medium, preferably a lower alkanol such as ethanol. The preferred starting materials of Formula X are those in which R'' is alkyl, more preferably the ethyl ester. The reaction product of Formula VIII may be isolated from the reduction reaction mixture by working up by conventional procedures.

The compounds of the Formula X are novel compounds and preferably prepared in a Step 7 reaction involving subjecting a compound of the Formula XI:

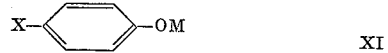

XI wherein X is as defined and M is a metal cation, preferably an alkali metal cation such as sodium or potassium, to reaction with a compound of the Formula XII:

XII wherein X and R'' are as above defined.

The reaction of Step 7 may be carried out at temperatures in the range of from minus 20° C. to plus 50° C., preferably 15° C. to 40° C., and in the presence of an inert organic solvent, followed by isolation of the reaction product of Formula X in a conventional manner. The starting material of Formula XI may be prepared from the corresponding p-halophenol by reacting the phenol in a conventional manner with any of the agents commonly employed for preparing metal salts, e.g., sodium hydride and the alkali metal alkoxides. The formation of the salt is typically effected at temperatures of from 0° C. to 30° C. The formation of the salt is carried out in an inert organic solvent of conventional type which conveniently is also useful for the preparation of compounds X in the Step 7 reaction. The preferred solvents of this type are the amides such as dimethylacetamide, diethylacetamide and dimethylforamide. Other suitable solvents include dioxane and the like. In preparing the compounds of Formula X by the Step 7 reaction it is generally preferred to employ the compounds of Formula XII in which R' is lower alkyl, and when the compounds of Formula X in which R" is hydrogen are desired it is preferred to obtain such compounds by saponification in a conventional manner of the compounds X in which R" is lower alkyl.

The compounds of Formulae XI and XII are either known or may be prepared from known materials by established procedures.

Also within the scope of the present invention are pharmaceutically acceptable acid addition salts not materially affecting the pharmacological effect of the compounds of Formula I. Such acid addition salts include, by way of illustration, the hydrochloride, fumarate, formate, acetate, sulfonate, malonate, tartrate, methanesulfonate and hydrosulfate. The acid addition salts may be produced as desired from the corresponding free bases by conventional procedures. Conversely, the free bases may be obtained from the salts by procedures known in the art.

The compounds of structural Formula I are useful because they possess pharmacological activity in animals. In particular, the compounds are useful as hypolipidemic agents, as evidenced, for example, by having hypocholesteremic and hypotriglyceridemic activity, as indicated by tests on a group of white rats which are given 5–100 milligrams per kilogram of body weight per diem of the compound orally, for 6 days, followed by extraction with isopropanol of serum or plasma after anesthetizing the rats with sodium hexabarbital, and then noting the cholesterol and triglyceride contents as compared to those of a control group. The cholesterol and triglyceride contents are determined by the methods described by Lofland, H.B., Anal. Biochem. 9:393 (1964): (Technicon method N 24a): and Kessler, G., and Lederer, H., Technicon Symposium, Mediad Inc., New York, pp. 345–347, (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 1 milligrams to about 75 milligrams per kilogram of animal body weight, preferably given in divided doses, 2 to 4 times a day, or in sustained release form. For most mammals the total daily dosage is from about 50 milligrams to about 1000 milligrams of the compound, and the dosage forms suitable for internal use comprise from about 12.5 milligrams to about 500 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluent such as calcium carbonate, sodium carbonate, lactose and talc, granulating and disintegrating agents, e.g., starch and alginic acid, binding agents, e.g., starch, gelatin and acacia, and lubricating agents, e.g. magnesium stearate, stearic acid and talc. The tablets may be uncoated or coated by known techniques to delay disintegration and adsorption in the gastro-intestinal tract and thereby provide a sustained action over a longer period. Similarly, suspensions syrups and elixirs may contain the active ingredient in admixture with any of the conventional excipients utilized for the preparation of such compositions, e.g., suspending agents (methylcellulose, tragacanth and sodium aliginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and koalin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
|---|---|
| 2 - [p - (3,5 - diphenylcyclohexyl)phenyl]-2 - methyl - N,N,N',N' - tetramethyl - 1,3-propanediamine | 50 |
| Tragacanth | 10 |
| Lactose | 197.5 |
| Corn starch | 25 |
| Taclum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

2-[p-(3,5-diphenylcyclohexyl)phenoxy]-2-methyl-N,N,N',N'-tetramethyl-1,3-propanediamine

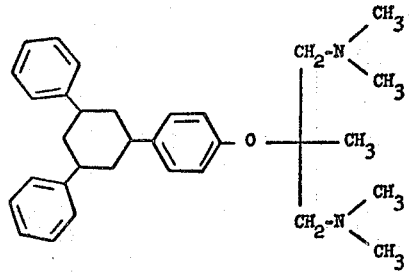

Step A.—Preparation of (p-bromophenoxy)-methyl-malonic acid diethyl ester

A dispersion of 8 1g. of 59.1% sodium hydride in mineral oil is rinsed twice with ligroin and suspended in 1000 ml. of anhydrous N,N-dimethylacetamide in a nitrogen atmosphere. After cooling this suspension in an ice-bath a solution of 346 g. of p-bromophenol is added dropwise and the mixture stirred for one hour at 5–10° C. There is then added 495 g. of bromo-methyl-malonic acid diethyl ester dropwise at the same temperature and the resulting solution is stirred overnight at room temperature. After the addition of 1000 ml. of benzene and 1000 ml. of ice-water the stirring is continued for 15 minutes and the two layers are allowed to separate. The aqueous layer is extracted with benzene, the combined benzene layers are washed successively with 2 N-sodium hydroxide solution and water. Evaporation in vacuo yields a crude oil which is purified by distillation in high vacuum to obtain (p-bromophenoxy)-methyl-malonic acid diethyl ester, $N_D^{25}=1.5112$.

Step B.—Preparation of 2-methyl-2-(p-bromophenoxy)-1,3-propanediol

A solution of 23.8 g. of p-bromophenoxy-methyl-malonic acid diethyl ester in 200 ml. of ethanol is heated at 50–60° C. and 5.75 g. of sodium borohydride is added in small portions with stirring over a period of 30 minutes. The resulting solution is refluxed for 6 hours and 30 ml. of a concentrated solution of ammonium hydroxide is added. The ethanol is evaporated and the residue extracted with ethyl acetate. The organic layer is washed neutral with a saturated aqueous solution of sodium chloride and dried over anhydrous sodium sulfate. Evaporation of the solvent yielded a crystalline material which was recrystallized from petroleum ether to obtain 2-methyl-2-(p-bromophenoxy)-1,3-propanediol M.P. 102–104° C.

Step C.—Preparation of 2-methyl-2-(p-bromophenoxy)-1,3-propanediol ditoluene sulfonate To an ice-cooled solution of 240 g. 2-methyl - 2 - (p-bromophenoxy)-1,3-propanediol and 226 g. triethylamine in 2000 ml. chloroform is added over a period of 20 minutes 600 g. p-toluenesulfonylchloride in 1000 ml. chloroform. The resulting solution is stirred for 3 hours in an ice-bath and then at room temperature overnight. After adding 1000 ml. of water the stirring is continued for 30 minutes and the two phases allowed to separate. The organic layer is washed twice with 2 N-hydrochloric acid. 1 N sodium bicarbonate and water and dried over anhydrous sodium sulfate. Evaporation of the solvent gives a crude solid which is recrystallized from ethyl acetate to obtain 2-methyl-2-(p-bromophenoxy)-1,3-propanediol ditoluene sulfonate, M.P. 117–119° C.

Step D.—Preparation of 2-methyl-2-(p-bromophenoxy)-N,N,N',N'-tetramethyl-1,3-propanediamine A mixture of 15 g. of 2-methyl-2-(p-bromophenoxy)-1,3-propanediol ditoluenesulfonate, 30 ml. dimethylacetamide and 100 ml. dimethylamine is heated in a sealed tube for 50 hours at 150° C. The dimethylacetamide and excess dimethylamine are distilled off under reduced pressure, the residue is acidified with 150 ml. of 1 N hydrochloric acid and extracted with diethyl ether. The aqueous layer is made alkaline with 2 N sodium hydroxide solution and extracted three times with diethyl ether. The three ether extracts are combined and dried over anhydrous magnesium sulfate. Removal of the solvent yielded an oil which is further purified by distillation in the high vacuum to obtain an oil of 2-methyl-2-(p-bromophenoxy)-N,N,N',N'-tetramethyl-1,3-propanediamine.

Step E.—Preparation of 1-{p - [1,1 - bis(dimethylaminomethyl)ethoxy]phenyl}-3,5-diphenylcyclohexan-1-ol A solution of 4.8 g. of 2-methyl-2-(p-bromophenoxy)-N,N,N',N'-tetramethyl-1,3-propanediamine in 20 ml. of anhydrous tetrahydrofuran is added dropwise to 0.370 g. of magnesium turnings in 10 ml. of refluxing anhydrous tetrahydrofuran. The reaction is carried out under nitrogen. After the addition is completed the resulting mixture is gently refluxed for an additional hour. A solution of 3.0 g. of 3,5-diphenylcyclohexanone in 40 ml. of anhydrous tetrahydrofuran is then added dropwise at room temperature and the reaction mixture is refluxed for 4 hours then stirred overnight at room temperature and finally hydrolyzed with saturated ammonium chloride solution. The resulting alkaline mixture is extracted twice with diethyl ether, the combined ether layers washed neutral with water and dried over anhydrous magnesium sulfate. Evaporation in vacuo yields a crude oil of 1-{p-[1,1-bis(dimethylaminomethyl)ethoxy]phenyl} - 3,5 - diphenyl-cyclohexan-1-ol.

Step F.—Preparation of 2-[p-(3,5 - diphenylcyclohexyl)phenoxy] - 2 - methyl - N,N,N',N' - tetramethyl - 1,3-propanediamine A solution of 9.3 g. of the crude oil obtained in Step E, above, in 150 ml. of glacial acetic acid is hydrogenated at atmospheric pressure over 9.3 g. of 10% palladium on charcoal. The catalyst is separated by filtration and the solvent evaporated in vacuo. The residue is taken up in water, made alkaline with 2 N sodium hydroxide solution and extracted with diethyl ether. The ethereal layer is washed neutral with water, dried over anhydrous magnesium sulfate and concentrated in vacuo. The crude oily residue is purified first by high vacuum distillation and then by column chromatography on silica gel. The resulting oil is dissolved in diethyl ether and treated with an excess of a saturated solution of hydrogen chloride in ether. The solvent is decanted and the white solid which is obtained triturated several times with diethyl ether. This solid material is then recrystallized twice from isopropanol to obtain 2 - [p - (3,5 - diphenylcyclohexyl)phenoxy] - 2 - methyl-N,N,N',N' - tetramethyl - 1,3 - propanediamine, M.P. 221–223° C.

EXAMPLE 2

Following the procedure of Example 1 the following compound of the invention is obtained:

(a) 2-[p - (3,5 - diphenylcyclohexyl)phenoxy]-2-methyl-1,3 - di - N - pyrrolidyl - propane dihydrochloride, M.P. 228–229.5° C.

EXAMPLE 3

2-(5' - phenyl - m - terphenyl - 4 - yloxy) - 2 - methyl-N,N,N',N' - tetramethyl - 1,3 - propanediamine dihydrochloride

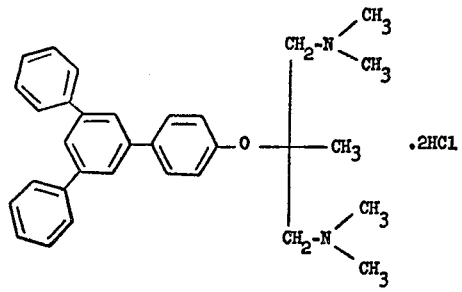

Step A.—Preparation of 1-{p-[1,1 - bis(dimethylaminomethyl)ethoxy]phenyl}-3,5-diphenyl - 2 - cyclohexen-1-ol A solution of 7.2 g. of 2-methyl-2-(p-bromophenoxy)-N,N,N',N'-tetramethyl-1,3-propanediamine in 30 ml. of anhydrous tetrahydrofuran is added dropwise to 0.55 g. of magnesium turnings in 15 ml. of refluxing anhydrous tetrahydrofuran. The reaction is carried out under nitrogen. After the addition is completed the resulting mixture is gently refluxed for an additional hour. A solution of 4.4 g. of 3,5-diphenyl-2-cyclohexen-1-one in 50 ml. of anhydrous tetrahydrofuran is then added dropwise at room temperature and the reaction mixture is refluxed for 4 hours then stirred overnight at room temperature and finally hydrolyzed with saturated ammonium chloride solution. The resulting alkaline mixture is extracted twice with diethyl ether, the combined ether layers washed neutral with water and dried over anhydrous magnesium sulfate. Evaporation in vacuo yields a crude oil of 1-{p-[1,1-bis(dimethylaminomethyl)ethoxy]phenyl} - 3,5 - diphenyl-2-cyclohexen-1-ol.

Step B.—Preparation of 2-(5'-phenyl-m-terphenyl-4-yloxy) - 2 - methyl - N,N,N',N' - tetramethyl-1,3-propanediamine dihydrochloride A solution of 3.6 g. of 1-{p-[1,1-bis(dimethylaminomethyl)ethoxy]phenyl} - 3,5-diphenyl-2-cyclohexen-1-ol dissolved in 15 ml. dry methylene chloride is cooled with stirring to minus 50° C. (Dry-Ice-acetone bath), and there is added a solution of 1.2 g. thionyl chloride in 4 ml. methylene chloride at dropwise rate permitting maintenance of reaction mixture temperature between minus 40° C. to minus 50° C. The resulting solution is then stirred for about one hour at temperatures of minus 60° C. The reaction mixture is then poured onto a mixture of 10 g. of crushed ice and 20 ml. of water and made alkaline (pH> 10) by addition of 50% sodium hydroxide solution. The resulting mixture is then extracted three times each with 100 ml. ether. The extracts are combined, washed with 25 ml. of saturated sodium chloride solution, dried over anhydrous magnesium sulfate, and concentrated in vacuo to obtain an oil which is dissolved in 20 ml. of absolute ether. The resulting mixture is then treated with saturated solution of hydrogen chloride in ether with stirring during the addition to obtain a solid material. The ether is decanted and the solid triturated 4 times each with 30 ml. of absolute ether. The resulting crude hydrochloride salt is dissolved in a minimum amount of refluxing isopropanol, filtered hot over charcoal and cooled on an ice-bath to obtain 2-(5'-phenyl-m-terphenyl-4-yloxy - 2 - methyl-N,N,N',N'-tetramethyl-1,3-propanediamine dihydrochloride.

What is claimed is:
1. A compound from the group consisting of:
(A) A compound of the formula:

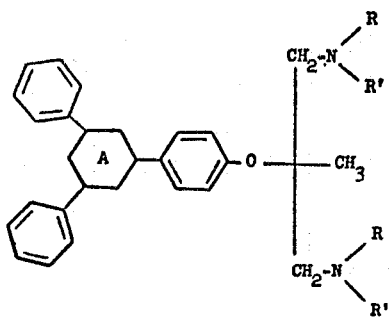

wherein:
Ring A is the fully saturated or the aromatic hydrocarbon ring, and
each of R and R' is independently lower alkyl, or together with the nitrogen to which they are attached form a saturated heterocyclic ring having 5 to 7 ring atoms of which one is nitrogen and the balance are carbon atoms; and
(B) an N-oxide of the compounds of (A), above; or a pharmaceutically acceptable acid addition salt of (A) and (B), above.

2. A compound of claim 1 in which the Ring A is fully saturated.
3. A compound of claim 2 in which each of R and R' is lower alkyl.
4. The compound of claim 3 in which each of R and R' is methyl.
5. A compound of claim 2 in which each pair of R and R' together with the nitrogen to which they are attached form N-pyrrolidyl.
6. A compound of claim 1 which is an N-oxide.
7. A compound of claim 1 in which the Ring A is the aromatic hydrocarbon ring.
8. A compound of claim 7 in which each of R and R' is lower alkyl.
9. The compound of claim 8 in which each of R and R' is methyl.

References Cited
UNITED STATES PATENTS
3,350,390  10/1967  Huenig et al. _____ 260—239

ALEX MAZEL, Primary Examiner
J. A. NARCAVAGE, Assistant Examiner

U.S. Cl. X.R.
260—239 B, 293.64, 570.7, 615 R; 424—244, 267, 274, 330